US012094647B2

(12) United States Patent
Otsubo

(10) Patent No.: US 12,094,647 B2
(45) Date of Patent: *Sep. 17, 2024

(54) NON-DIRECTIONAL FREE ELECTRON GENERATING REPELLING MAGNET COMBINATION

(71) Applicant: Hirofusa Otsubo, Middle Village, NY (US)

(72) Inventor: Hirofusa Otsubo, Middle Village, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/228,749

(22) Filed: Aug. 1, 2023

(65) Prior Publication Data

US 2023/0377796 A1 Nov. 23, 2023

Related U.S. Application Data

(63) Continuation of application No. 18/095,192, filed on Jan. 10, 2023, now Pat. No. 11,756,730, which is a (Continued)

(51) Int. Cl.
*H01F 41/02* (2006.01)
*H01F 7/02* (2006.01)

(52) U.S. Cl.
CPC ....... *H01F 41/0266* (2013.01); *H01F 7/0268* (2013.01); *Y10T 29/49075* (2015.01); *Y10T 29/53417* (2015.01)

(58) Field of Classification Search
CPC .. F16B 1/00; F16B 2001/0035; H01F 7/0221; H01F 41/0266; H01R 13/6205;
(Continued)

(56) References Cited

U.S. PATENT DOCUMENTS 658,027 A 9/1900 Steiger
3,326,610 A 6/1967 Baermann
(Continued)

OTHER PUBLICATIONS

Written Opinion of the International Searching Authority for PCT/US2022/013497 established by the ISA/US completed on May 4, 2022.

*Primary Examiner* — Thiem D Phan
(74) *Attorney, Agent, or Firm* — Goldstein Law Offices, P.C.

(57) ABSTRACT

An apparatus for assembling a repelling magnet combination, comprising a first and second magnet, a first and second holding magnet, a first holding base with a first holding base first end, and a second holding base with a second holding base first end. The first and second holding magnets are positioned at the first and second holding base first ends, and the first and second magnets are magnetically attached to the first and second holding magnets respectively, with outward faces exhibiting like magnetic polarities. The first and second magnets are brought into contact by moving the first and second holding base first ends into close proximity, whereby the first and second holding magnets exert holding forces on the first and second magnets which overcome a repelling force generated therebetween, allowing a repelling force countering means, such as an adhesive, to bond the magnets together into a repelling magnet combination.

6 Claims, 13 Drawing Sheets

Related U.S. Application Data continuation of application No. 17/196,040, filed on Mar. 9, 2021, now Pat. No. 11,610,731.

(58) Field of Classification Search
CPC ......... Y10T 29/49826; Y10T 29/53417; Y10T 29/49075; B03C 1/0332; B03C 2201/26
USPC ....... 29/607, 602.1, 609, 729, 737, 744, 795
See application file for complete search history.

(56) References Cited

U.S. PATENT DOCUMENTS

| | | | | |
|---|---|---|---|---|
| 3,921,620 | A | 11/1975 | Nakayama | |
| 4,471,331 | A | 9/1984 | Wyatt | |
| 4,587,956 | A | 5/1986 | Griffin et al. | |
| 5,168,221 | A | 12/1992 | Houston | |
| 5,176,618 | A | 1/1993 | Freedman | |
| 5,440,997 | A | 8/1995 | Crowley | |
| 5,825,308 | A | 10/1998 | Rosenberg | |
| 6,147,422 | A | 11/2000 | Delson et al. | |
| 6,155,967 | A | 12/2000 | Catlett | |
| 6,348,033 | B1 | 2/2002 | Catlett | |
| 6,623,419 | B1 | 9/2003 | Smith et al. | |
| 6,706,178 | B2 | 3/2004 | Simonson | |
| 6,936,937 | B2 | 8/2005 | Tu et al. | |
| 7,097,610 | B2 | 8/2006 | Woo | |
| 7,101,374 | B2 | 9/2006 | Hyde, Jr. | |
| 7,188,627 | B2 * | 3/2007 | Nelson | A61F 2/00 128/898 |
| 7,718,059 | B2 | 5/2010 | Park et al. | |
| 7,816,830 | B2 | 10/2010 | Dickes | |
| 7,982,568 | B2 | 7/2011 | Fullerton et al. | |
| 8,098,514 | B2 | 1/2012 | Nagase et al. | |
| 8,670,271 | B2 | 3/2014 | Zheng et al. | |
| 8,697,225 | B2 | 4/2014 | Aramaki et al. | |
| 8,740,764 | B1 | 6/2014 | Newman | |
| 8,943,677 | B2 | 2/2015 | Gerster et al. | |
| 8,963,380 | B2 * | 2/2015 | Fullerton | H02K 21/24 310/12.21 |
| 9,431,161 | B2 | 8/2016 | Paul | |
| 9,721,710 | B2 | 8/2017 | Aronstam et al. | |
| 9,962,555 | B1 | 5/2018 | Charles et al. | |
| 10,667,937 | B2 | 6/2020 | Solomon et al. | |
| 2002/0132136 | A1 | 9/2002 | Roshen | |
| 2004/0059423 | A1 | 3/2004 | Barnes et al. | |
| 2004/0139975 | A1 | 7/2004 | Nelson et al. | |
| 2005/0182287 | A1 | 8/2005 | Becker | |
| 2006/0051233 | A1 | 3/2006 | Ugai et al. | |
| 2006/0158292 | A1 | 7/2006 | Ugai et al. | |
| 2007/0144533 | A1 | 6/2007 | Nelson et al. | |
| 2007/0209665 | A1 | 9/2007 | Gillis et al. | |
| 2008/0103350 | A1 | 5/2008 | Farone | |
| 2008/0306324 | A1 | 12/2008 | Bonutti et al. | |
| 2010/0056846 | A1 | 3/2010 | Friberg | |
| 2010/0211184 | A1 | 8/2010 | Rousseau et al. | |
| 2011/0017222 | A1 | 1/2011 | Li et al. | |
| 2011/0144411 | A1 | 6/2011 | Sandhu et al. | |
| 2011/0152967 | A1 | 6/2011 | Simon et al. | |
| 2012/0029591 | A1 | 2/2012 | Simon et al. | |
| 2012/0108884 | A1 | 5/2012 | Bechler et al. | |
| 2012/0130149 | A1 | 5/2012 | Diament et al. | |
| 2012/0229241 | A1 | 9/2012 | Fullerton et al. | |
| 2014/0100410 | A1 | 4/2014 | Balzer et al. | |
| 2014/0163306 | A1 | 6/2014 | Sykes | |
| 2015/0238357 | A1 | 8/2015 | Goldberg et al. | |
| 2016/0199230 | A1 | 7/2016 | Doshi et al. | |
| 2016/0338906 | A1 | 11/2016 | Bechler et al. | |
| 2017/0049387 | A1 | 2/2017 | Saitoh et al. | |
| 2017/0290733 | A1 | 10/2017 | Lin | |
| 2018/0185663 | A1 | 7/2018 | Bean | |
| 2018/0229049 | A1 | 8/2018 | Phillips et al. | |
| 2018/0280714 | A1 | 10/2018 | Souder | |
| 2020/0046993 | A1 | 2/2020 | Otsuba | |

* cited by examiner

NON-DIRECTIONAL FREE ELECTRON GENERATING REPELLING MAGNET COMBINATION

CROSS-REFERENCE TO RELATED APPLICATIONS

This application is a continuation of non-provisional patent application Ser. No. 18/095,192 filed in the United States Patent Office on Jan. 10, 2023, which is in a turn a continuation of U.S. Pat. No. 11,610,731 filed in the United States Patent Office on Mar. 9, 2021. This application claims priority to the abovementioned patent application and patent, which are expressly incorporated herein by reference in their entirety.

TECHNICAL FIELD

The present disclosure relates generally to a combination of two magnets in a repelling configuration. More particularly, the present disclosure relates to a combination of two magnets bonded together in a repelling configuration which produces non-directional free electrons, and methods for the assembly thereof.

BACKGROUND

Magnets used for therapeutic purposes typically produce focused, directional electron flows leading from one pole of the magnet to the opposite pole. However, placing like poles from two separate magnets in a repelling configuration causes the magnetic fields produced by each magnet to repel each other, thus causing a large portion of the electrons to scatter as non-directional free electrons, further resulting in a substantial reduction in the magnetic power of both magnets.

Conventional methods for attaching two magnets together in repelling configurations often utilize high impact or heat in order to overcome magnetic repulsion, particularly when working with strong magnets. However, both impact and heat have detrimental effects by damaging and demagnetizing the magnets. Therefore, a need exists for an apparatus and method which allows two repelling magnets to be brought together and placed into contact without the magnets being forced out of position by repulsion forces or flipping over due to attractive forces, and which further allows the repelling magnets to be permanently bonded together.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide an apparatus for permanently bonding two repelling permanent magnets without using heat or impact to effect the bond therebetween. Accordingly, the present disclosure provides a repelling force countering means, first holding base, a second holding base, a first holding magnet attached to the first holding base, and a second holding magnet attached to the second holding base. A first magnet and a second magnet are placed in securing positions at the first holding base first end and the second holding base first end respectively, with the first and second magnets showing outward faces exhibiting like magnetic polarities. The first and second holding bases allow the first magnet and a second magnet to be brought into close proximity, while the first and second holding magnets produce magnetic holding forces which hold the first and second magnets in the securing positions, allowing the first and second magnets to be pressed together into a repelling configuration, whereupon the repelling force countering means overcomes a repelling force generated between the first and second magnets and prevents the separation thereof. The repelling force countering means comprises a bonding adhesive which bonds the first magnet to the second magnet. Application of the repelling force countering means is followed by the removal of the completed repelling magnet combination, by detaching the repelling magnet combination from the first and second holding magnets of the first and second holding bases.

It is another aspect of an example embodiment in the present disclosure to provide an apparatus which allows the first and second magnets to be permanently joined without adhesives. Accordingly, the present disclosure provides a physical interlock comprising a first interlocking portion on the first magnet, and a second interlocking portion on the second magnet. The first interlocking portion engages with the second interlocking portion and prevents the first and second magnets from separating under the repelling force.

It is yet another embodiment in the present disclosure, to provide an apparatus which maintains the first and second magnets in the repelling configuration and provides a protective layer. Accordingly, the repelling force countering means may further comprise a capsule with a capsule first portion and a capsule second portion. The first magnet is placed within a first magnet holding space within the capsule first portion, which is then positioned at the first holding base first end. The second magnet is placed within a second magnet holding space within the capsule second portion, which is then positioned at the second holding base first end. The capsule first and second portions are brought together and are interlocked using a capsule locking means, with the first and second magnets pressed together therebetween. The capsule may also encase and protect the repelling magnet combination from external damage or moisture exposure.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
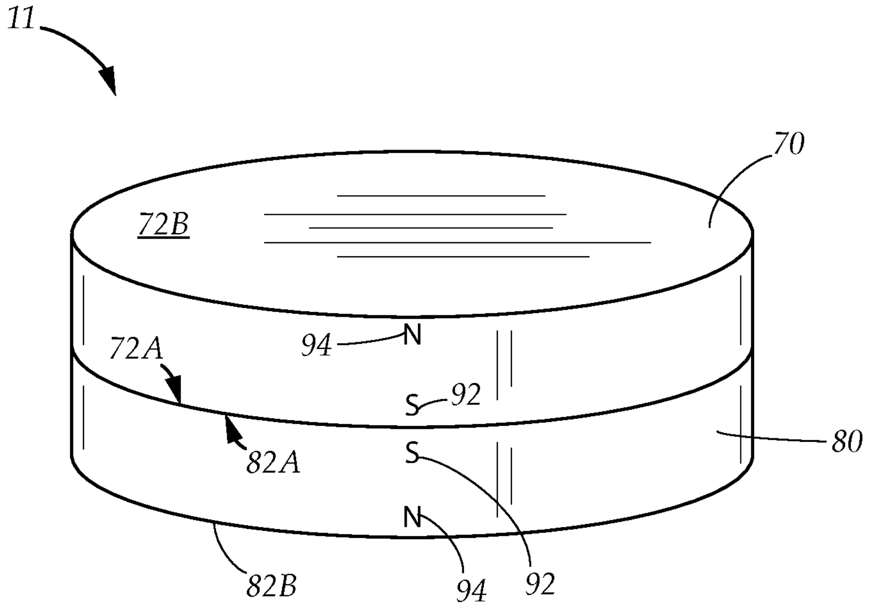
FIG. 1 is a diagrammatical perspective view of a first and second magnet held together to form a repelling magnet combination, in accordance with an embodiment in the present disclosure.

FIG. 1 illustrates a repelling magnet combination 11 comprising a first magnet 70 positioned in contact with a second magnet 80. The first magnet 70 has a first magnet first face 72A and a first magnet second face 72B, while the second magnet 80 has a second magnet first face 82A and a second magnet second face 82B. The first and second magnets 70, 80 are held in a repelling position, with the first magnet first face 72A in contact with the second magnet first face 82A.

The first and second magnets 70, 80 each have a first magnetic pole 92 at the first magnet first face 72A and second magnet first face 82A respectively, and a second magnetic pole 94 at the first magnet second face 72B and the second magnet second face 82B respectively. The first and second magnets 70, 80 may be any form of permanent magnet, such as rare earth, alnico, ceramic, or other types of magnet. For example, the first and second magnets 70, 80 may be neodymium magnets. Although the first and second magnets 70, 80 as illustrated are substantially cylindrical or disc-shaped, this is not intended to be limiting, as the first and second magnets 70, 80 can be shaped as blocks or other shapes, while remaining consistent with the principles of the present disclosure.

The first magnetic poles 92 and second magnetic poles 94 produce magnetic fields with a first polarity and second polarity respectively. Magnetic poles having the same magnetic polarity will generate a repelling force, while magnetic poles having unlike magnetic polarities will generate an attractive force. Turning to FIG. 3F while also referring to FIG. 1, the repelling force generated between the first magnet first face 72A and the second magnet first face 82A is compensated for by using a repelling force countering means 20 to overcome the repelling force and maintain the first and second magnets 70, 80 in contact in the repelling configuration. In one embodiment, the repelling force countering means 20 is implemented using a bonding adhesive 68 of sufficient strength to overcome the repelling force, which is applied between the first magnet first face 72A and the second magnet first face 82A. In a preferred embodiment, the first and second magnets 70, 80 are substantially disc shaped, with the first and second magnets 70, 80 being substantially equal in diameter.

Figure 3A:
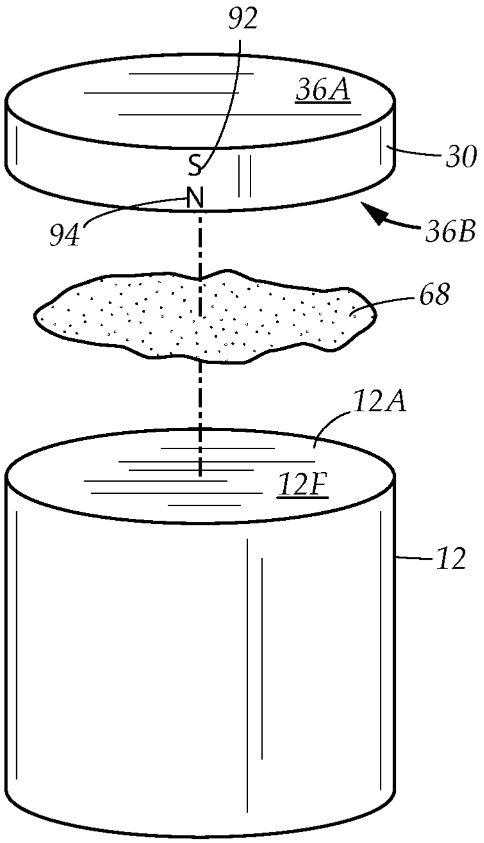
FIG. 3A is a diagrammatical exploded view of a first holding magnet being bonded to a first holding base, in accordance with an embodiment in the present disclosure.
Figure 3B:
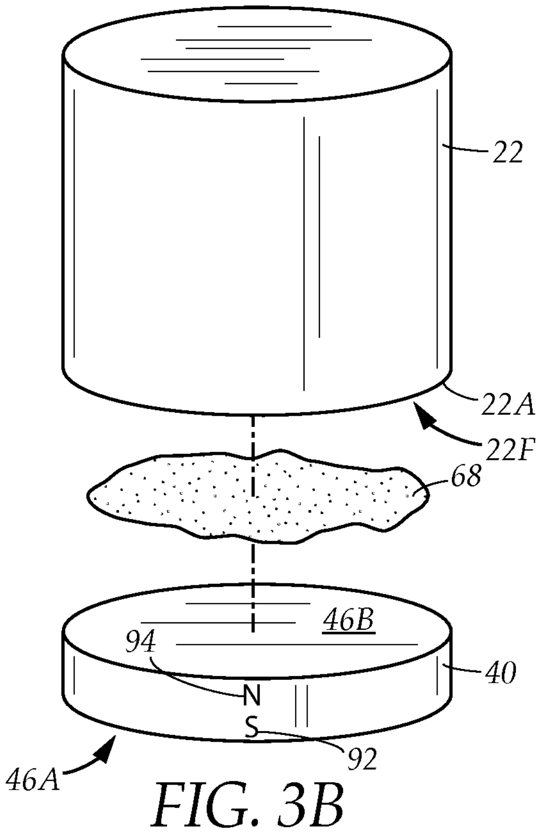
FIG. 3B is a diagrammatical exploded view of a second magnet being bonded to a second holding base, in accordance with an embodiment in the present disclosure.
Figure 3C:
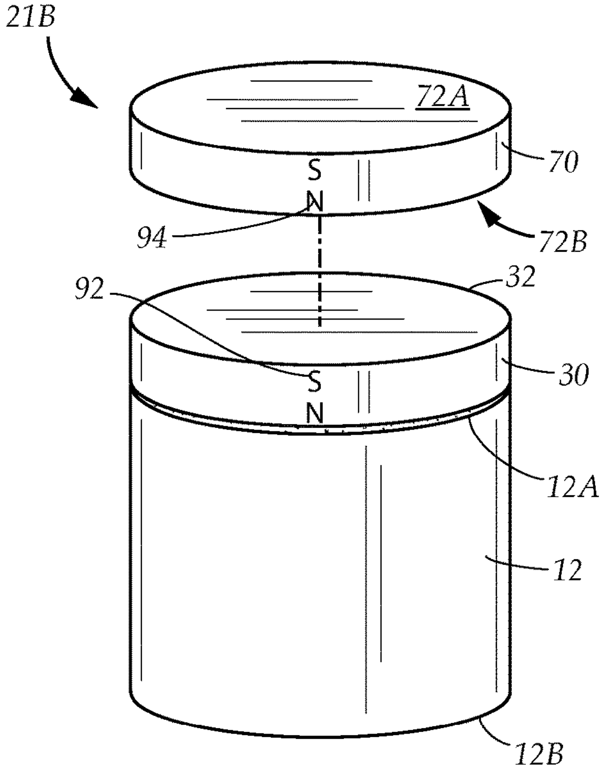
FIG. 3C is a diagrammatical exploded view of first magnet being magnetically attached to the first holding magnet, in accordance with an embodiment in the present disclosure.
Figure 3D:
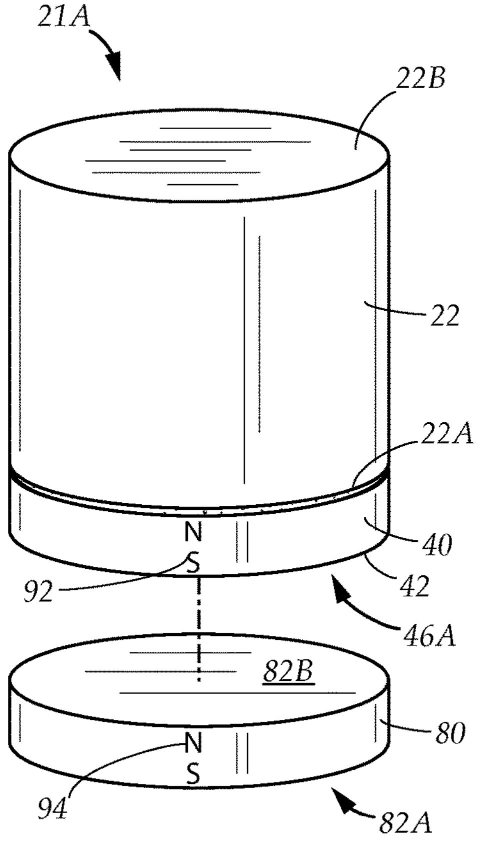
FIG. 3D is a diagrammatical exploded view of the second magnet being magnetically attached to the second holding magnet, in accordance with an embodiment in the present disclosure.
Figure 3E:
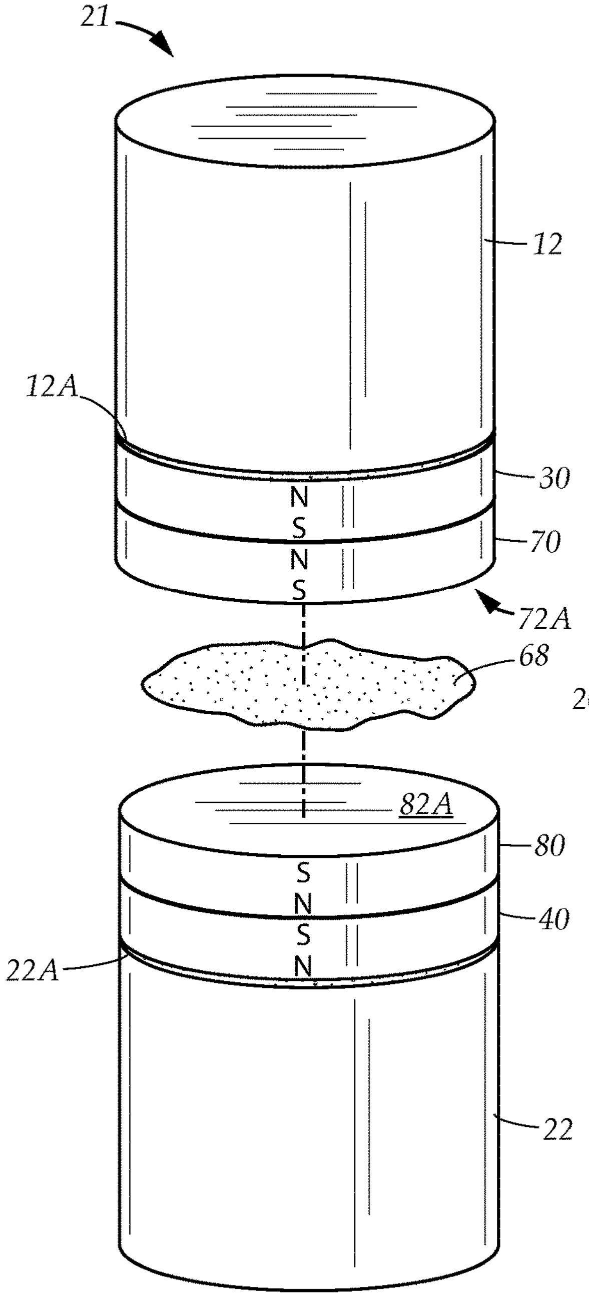
FIG. 3E is a diagrammatical exploded view showing the first and second magnets being pushed together using the first and second holding bases with a bonding adhesive placed therebetween, in accordance with an embodiment in the present disclosure.
Figure 3F:
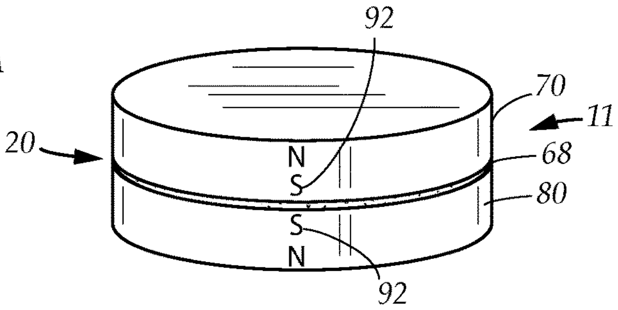
FIG. 3F is a diagrammatical perspective view of the first and second magnets bonded together to form the repelling magnet combination, in accordance with an embodiment in the present disclosure.

Turning to FIG. 3A-B, while also referring to FIGS. 3E-F, the repelling magnet combination 11 is assembled using a holding assembly 21 comprising a first holding base 12, a second holding base 22, a first holding magnet 30, and a second holding magnet 40. The function of the holding assembly 21 is to secure the first and second magnets 70, 80 in securing positions at the first holding base first end 12A and the second holding base first end 22A, and resist the repelling force generated therebetween as the first and second magnets 70, 80 are brought into contact in order to allow the repelling countering means 20 to be applied.

In one embodiment, the first holding base 12 has a first holding base first end 12A, to which the first holding magnet 30 is attached. Likewise, the second holding base 22 has a second holding base first end 22A, to which the second holding magnet 40 is attached. The first holding base 12 may have a first holding base first face 12F positioned at the first holding base first end 12A, while the second holding base 22 may have a second holding base first face 22F positioned at the second holding base first end 22A. In the present example, the first and second holding bases 12, 22 are cylindrical in shape. However, this is not intended to be limiting, and the first and second holding bases 12, 22 may be formed as blocks, plates, or in other shapes while adhering to the principles of the present disclosure.

Referring to FIGS. 3A-D, the first holding magnet 30 has a first holding magnet first face 36A exhibiting a first magnetic pole 92, and a first holding magnet second face 36B which exhibits a second magnetic pole 94 and is disposed opposite the first holding magnet first face 36A. The first holding magnet 30 is attached to the first holding base 12, by positioning the first holding magnet second face 36B in contact with the first holding base first end 12A. Similarly, the second holding magnet 80 has a second holding magnet first face 46A exhibiting a first magnetic pole 92, and second magnet second face 46B exhibiting a second magnetic pole 94 which is disposed opposite the second magnet first face 46A. The second holding magnet 40 is attached to the second holding base 22, by positioning the second holding magnet second face 46B in contact with the second holding base first end 22A. In one embodiment, the first and second holding magnets 30, 40 are substantially disc shaped, and may have a diameter which is approximately equal to the diameter of the first and second magnets 70, 80.

Referring to FIGS. 3C-D, the first magnet 70 and second magnet 80 are magnetically attached to the first holding magnet 30 and second holding magnet 40 respectively. In one embodiment, the securing positions correspond to the first holding magnet first face 36A and the second holding magnet first face 46A, and the first magnet second face 72B is attached to the first holding magnet first face 36A, while the second magnet second face 82B is attached to the second magnet second face 82B. The first magnetic poles 92 of the first and second holding magnet first faces 36A, 46A and the second magnetic poles 94 of the first and second magnet second faces 72B, 82B generate magnetic holding forces which secure the first magnet 70 to the first holding magnet 30 and the second magnet 80 to the second holding magnet 40.

Referring to FIG. 3E-F, the first and second magnets 70, 80 are brought together using the first and second holding bases 12, 22 by bringing the first holding base first end 12A towards the second holding base first end 22A, allowing the first magnet first face 72A to approach the second magnet first face 82A. The first and second holding bases 12, 22 may be manipulated manually by hand, or by mechanical means. For example, in certain embodiments, the first and second holding bases 12, 22 may be attached to a mechanical apparatus capable of bringing together, separating, or rotating the first and second holding bases 12, 22.

The magnetic holding forces generated by the first and second holding magnets 30, 40 hold the first and second magnets 70, 80 in place as the first and second magnets 70, 80 are brought together into contact, thereby counteracting the repelling force generated between the first and second magnet first faces 72A, 82A. In one embodiment, the bonding adhesive 68 which forms the repelling force countering means is applied to either the first magnet first face 72A or the second magnet first face 82A prior to the first and second magnets 70, 80 being placed together in contact in the repelling configuration. The first and second magnets 70, 80 continue to be pressed together between the first and second holding base first ends 12A, 22A until the bonding adhesive 68 cures sufficiently to overcome the repelling force. Once the bonding adhesive 68 has cured, the first and second magnets 70, 80 are detached from the first and second holding magnets 30, 40, thus completing the repelling magnet combination 11.

Figure 2:
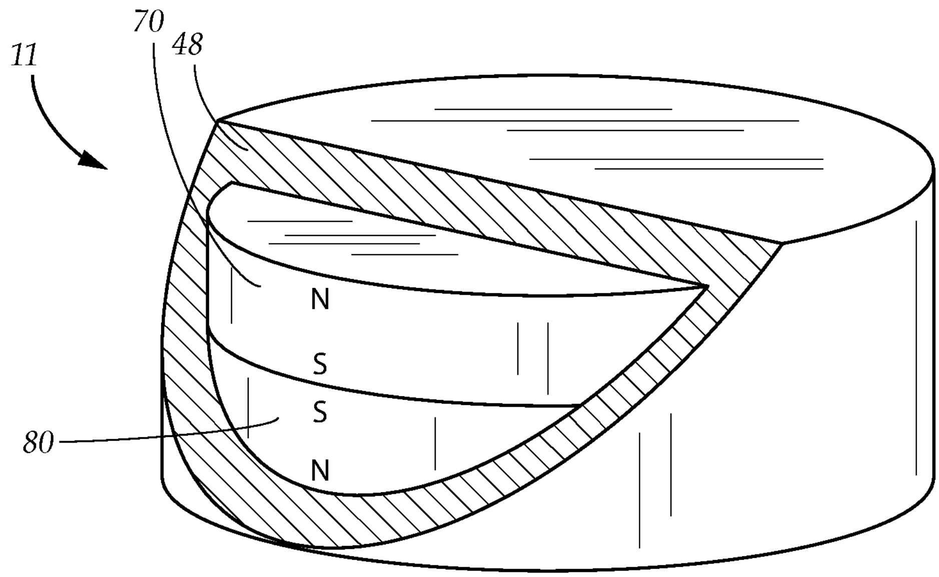
FIG. 2 is a partial cutaway view of the repelling magnet combination covered by a protective shell, in accordance with an embodiment in the present disclosure.

Referring to FIG. 2, the repelling magnet combination 11 may further comprise a protective shell 48 which covers the first and second magnets 70, 80. For example, the protective shell 48 may be a rubber or plastic encapsulation which shields the first and second magnets from exposure to moisture which may cause corrosion of the first and second magnets 70, 80.

Figure 4B:
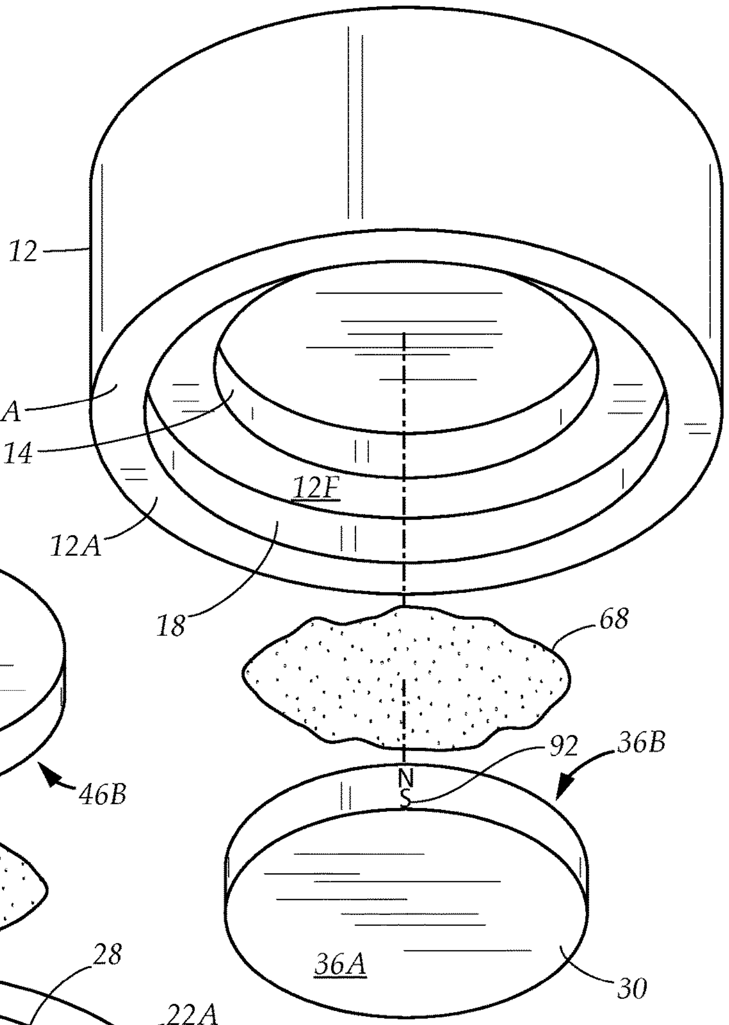
FIG. 4B is a diagrammatical exploded view of the first holding magnet being bonded within a magnet recess disposed on the first holding base, in accordance with an embodiment in the present disclosure.
Figure 4A:
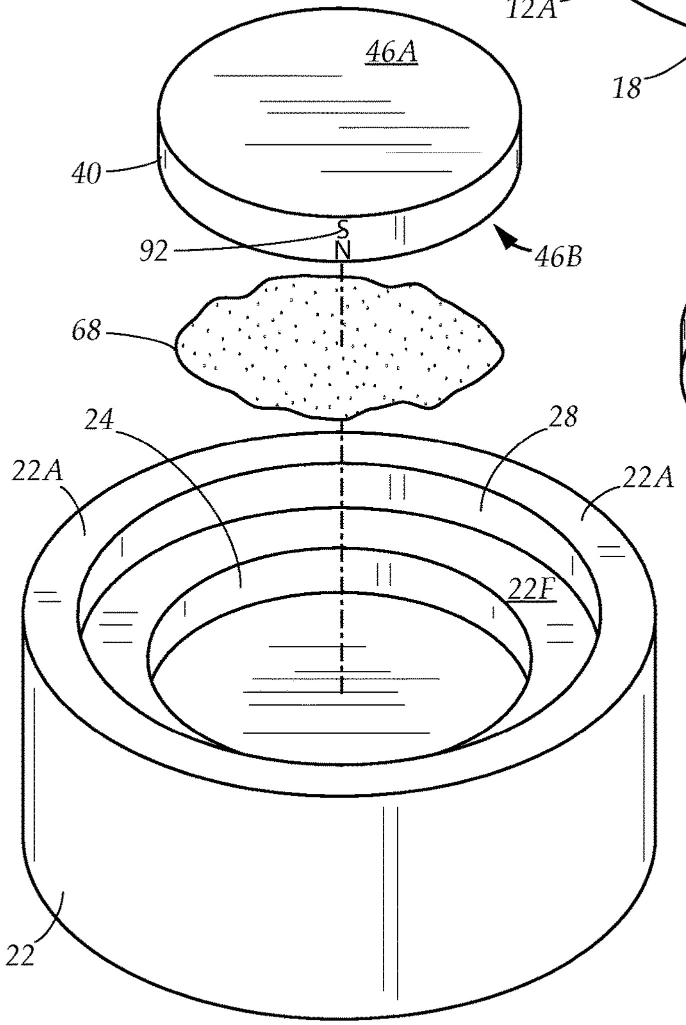
FIG. 4A is a diagrammatical exploded view of the second holding magnet being bonded within a magnet recess disposed on the second holding base, in accordance with an embodiment in the present disclosure.
Figure 4D:
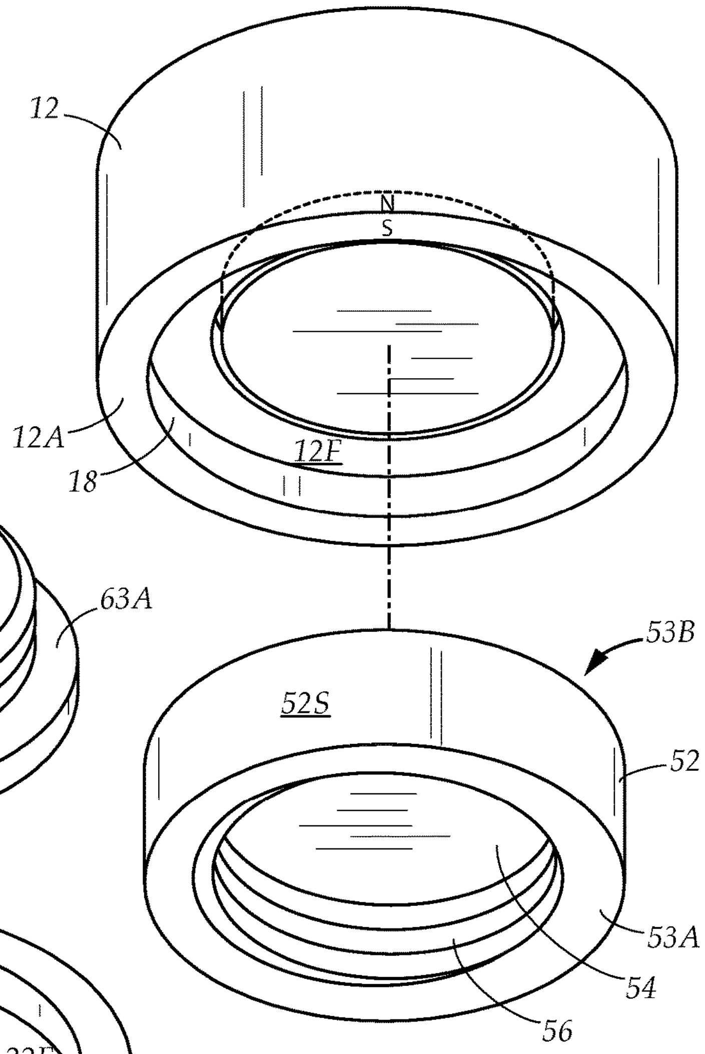
FIG. 4D is a diagrammatical exploded view of a capsule first portion being placed within a capsule holding recess disposed on the first holding base, in accordance with an embodiment in the present disclosure.
Figure 4C:
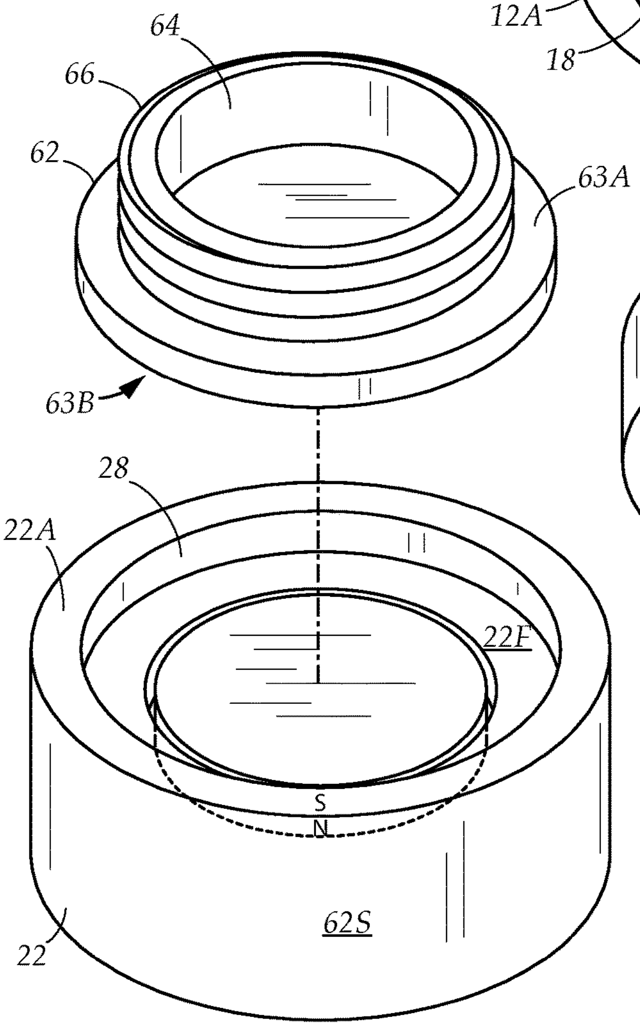
FIG. 4C is a diagrammatical exploded view of a capsule second portion being placed within a capsule holding recess disposed on the second holding base, in accordance with an embodiment in the present disclosure.
Figure 4F:
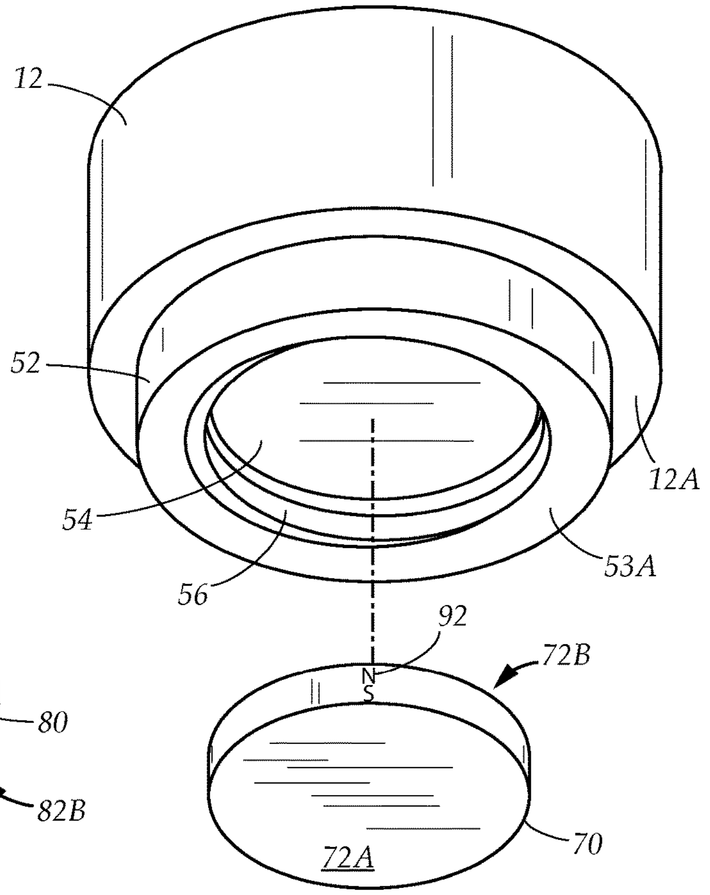
FIG. 4F is a diagrammatical exploded view showing the first magnet being placed in a magnet recess disposed within the capsule first portion, in accordance with an embodiment in the present disclosure.
Figure 4E:
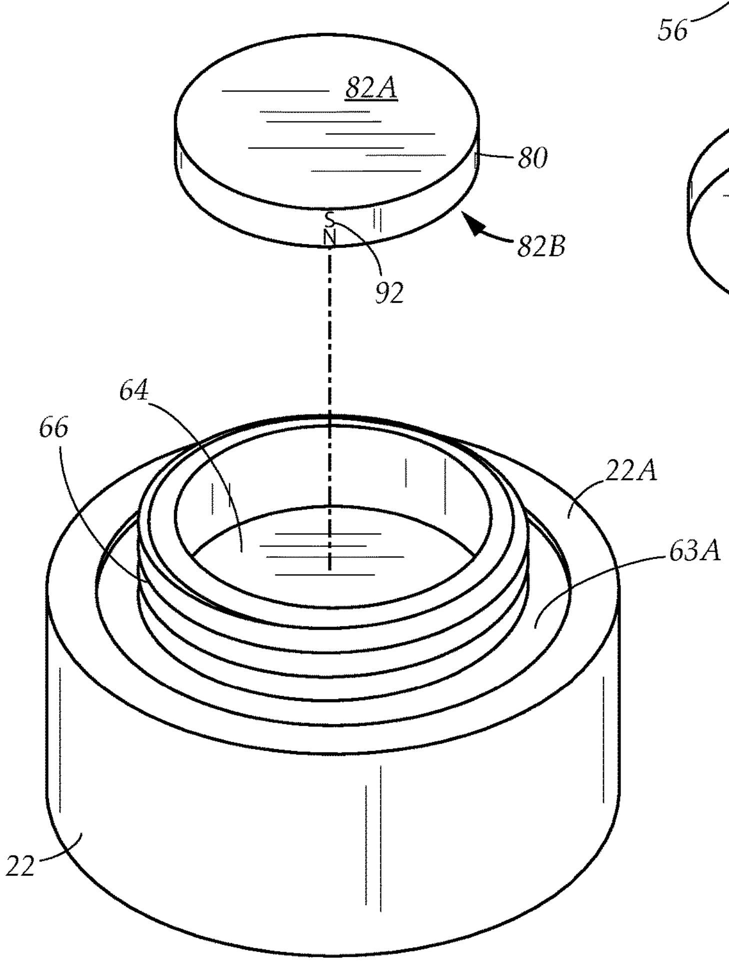
FIG. 4E is a diagrammatical exploded view showing the second magnet being placed in a magnet recess disposed within the capsule second portion, in accordance with an embodiment in the present disclosure.
Figure 4G:
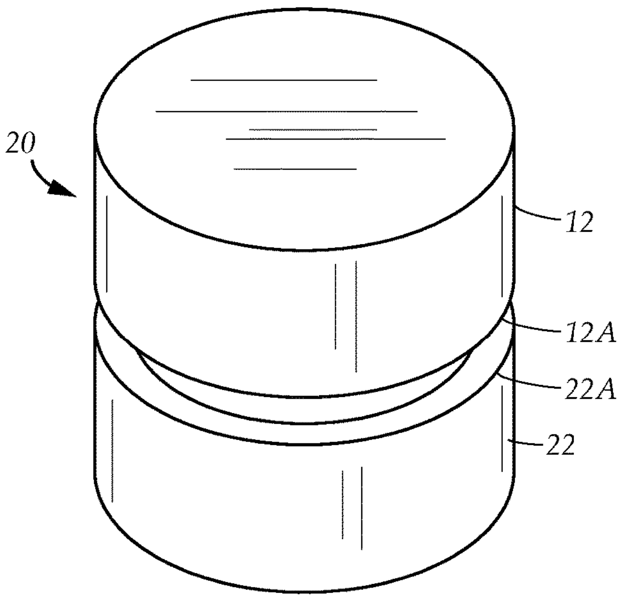
FIG. 4G is a diagrammatical perspective view showing the capsule first portion and the capsule second portion being joined together, in accordance with an embodiment in the present disclosure.
Figure 4H:
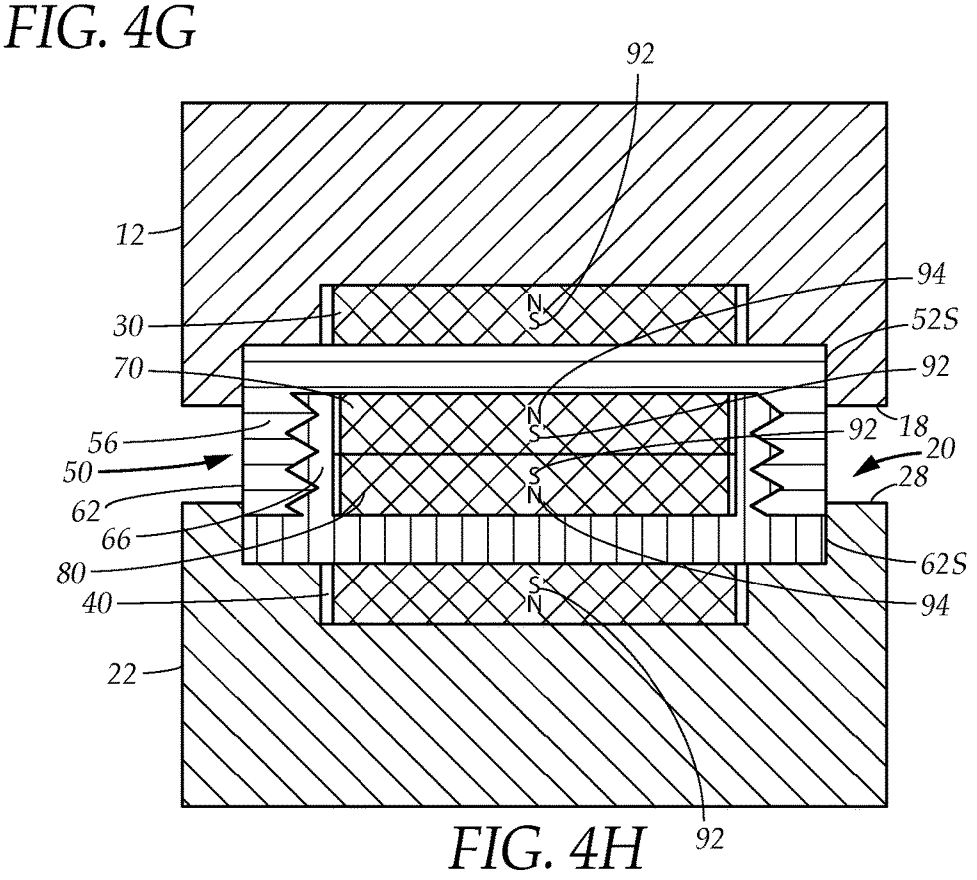
FIG. 4H is a diagrammatical section view showing the capsule from the side, depicting a first interlocking portion of the capsule first portion engaging with a second interlocking portion of the second capsule portion, to enclose the first and second magnets within the combined magnet recesses of the capsule first portion and the capsule second portion, in accordance with an embodiment in the present disclosure.
Figure 4I:
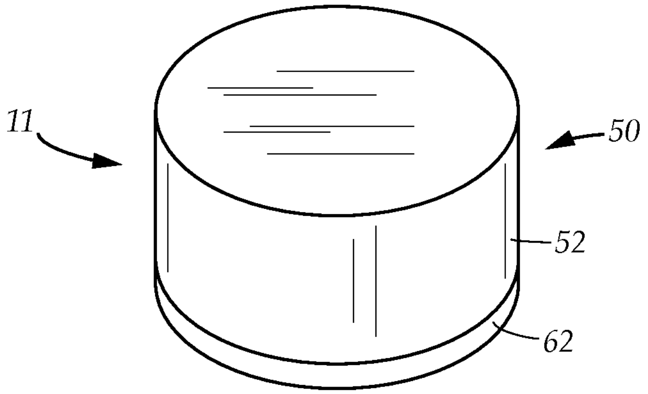
FIG. 4I is a diagrammatical perspective view of the capsule first and capsule second portions fully interlocked to form the capsule, in accordance with an embodiment in the present disclosure.

Turning to FIGS. 4G-H, an alternate repelling force countering means 20 is shown in another embodiment. The repelling force countering means 20 may be implemented as a capsule 50 comprising a capsule first portion 52 attached to a capsule second portion 62. The first and second magnets 70, 80 are positioned between the capsule first portion 52 and the capsule second portion 62, and the repelling force is countered by locking the capsule first and second portions 52, 62 together using a capsule locking means, thus maintaining the first and second magnets 70, 80 in the repelling configuration. The capsule 50 is formed from a non-magnetic material, such as plastic or other suitable material, and may also serve to protect the first and second magnets 70, 80 from external damage and corrosion due to exposure to moisture.

Turning to FIGS. 4C-D while continuing to refer to FIG. 4H, in one embodiment, the capsule first and second portions 52, are each substantially disc shaped, and the capsule 50 is substantially cylindrical. The capsule first portion 52 has a first capsule outer face 53B, and a first capsule second face 53A disposed opposite thereof, while the capsule second portion 62 has a second capsule outer face 63B and a second capsule first face 63A disposed opposite thereof. The capsule first portion 52 has a first interlocking portion 56 which projects away from the first capsule inner face 53A, while the capsule second portion 62 has a second interlocking portion 66 which projects away from the second capsule inner face 63A. The first interlocking portion 56 is adapted to threadably interlock with the second interlocking portion 66, to secure the capsule first portion 52 to the capsule second portion 62.

The capsule first portion 52 has a first magnet holding space 54 which is adapted to receive the first magnet 70. The first magnet holding space 54 may be implemented as a recess which opens away from the first capsule inner face 53A. In one embodiment, the first interlocking portion 56 forms a series of inwardly facing screw threads disposed within the first magnet holding space 54.

The capsule second portion 62 has a second magnet holding space 64 which is adapted to receive the second magnet 80. The second magnet holding space 64 may be implemented as a recess which opens away from the second capsule inner face 63A. In one embodiment, the second interlocking portion 66 forms a hollow cylindrical projection positioned centrally upon the second capsule inner face 63A, while the second magnet holding space 64 is positioned centrally within the second interlocking portion 66.

Referring to FIGS. 4E-F and FIG. 4G-H, in the illustrated embodiment, the securing positions correspond to the first and second magnet holding spaces 54, 64, and the first magnet 70 is placed within the first magnet holding space 54 with the first magnet first face 72A oriented outwardly away from the first capsule inner face 53A, while the second magnet 80 is placed within the second magnet holding space 64 with the second magnet first face 82A oriented outwardly away from the second capsule inner face 63A. The capsule first and second portions 52, 62 are brought together, and the second interlocking portion 66 engages with the first interlocking portion 56, thus locking the capsule first portion 52 together with the capsule second portion 62. The first and second magnet holding spaces 54, 64 are aligned, and the first and second magnets 70, 80 are pressed together with the first magnet first face 72A in contact with the second magnet first face 82A. The first and second interlocking portions 56, 66, forming the capsule locking means, counteract the repelling force and prevent the capsule first and second portions 52, 62 from separating, while also maintaining the first and second magnets in the repelling configuration.

Turning to FIGS. 4A-B and FIGS. 4C-D, the first and second holding bases 12, 22 may include further features to accept the capsule first and second portions 52, 62. The first holding base 12 may have a first holding magnet recess 14 disposed centrally upon the first holding base first face 12F which is adapted to receive the first holding magnet 30. Similarly, the second holding base 22 may have a second magnet recess 24 disposed centrally upon the second holding base first face 22F, which is adapted to receive the second holding magnet 40. The first and second holding magnets 30, 40 are placed within the first and second magnet recesses 14, 24 respectively with the first and second holding magnet first faces 36A, 46A oriented outwardly. The first and second holding magnets 30, 40 may be affixed within the first and second magnet holding recesses 14, 24 using bonding adhesive 68 or other means. The first and second magnet recesses 14, 24 may be sufficiently deep to allow the first holding magnet first face 36A and the second holding magnet first face 46A to be flush with the first holding base first face 12F and the second holding base first face 22F respectively.

Referring to FIGS. 4C-D along with FIGS. 4E-F and FIG. 4H, the capsule first portion 52 is attached to the first holding base first end 12, while the capsule second portion 62 is attached to the second holding base first end 22. The first capsule outer face 53B and the second capsule outer face 63B contact the first holding base first face 12F and the second holding base first face 22F respectively. The magnetic holding forces produced between the first holding magnet 30 and the first magnet 70 within the first magnet holding space, and between the second holding magnet 40 and the second magnet 80 within the second magnet holding space 64, pass through the capsule first portion 52 and the capsule second portion 62 respectively to magnetically hold the first and second magnets 70, 80 as well as the first and second capsule portions 52, 62 in place against the first holding base first face 12F and the second holding base first face 22F respectively.

The magnetic holding forces further counteract the repelling force generated between the first and second magnets 70, 80 as the first holding base first end 12A and the second holding base first end 22A are brought together, allowing the first interlocking portion 56 to be aligned with and engage with the second interlocking portion 66. The first magnet 70 or the second magnet 80 may then be rotated by turning the first holding base 12 or the second holding base 22, allowing the capsule locking means to lock the capsule first and second portions 52, 62 together. The combined capsule 50 is then detached from the first and second holding bases 12, 22 to complete the repelling magnet combination.

Returning to FIGS. 4C-D while also referring to FIG. 4H, in one embodiment, the first holding base 12 may further have a first retaining lip 18 projecting away from the first holding base first face 12F, while the second holding base 22 may further have a second retaining lip 28 projecting away from the second holding base first face 22F. When the capsule first portion 52 is in contact against the first holding base first face 12F and the capsule second portion 62 is in contact against the second holding base second face 22F, the first retaining lip 18 extends past the first capsule outer face 53B to contact the capsule first portion outer surface 52S while the second retaining lip extends past the second capsule outer face 63B to contact the capsule second portion outer surface 62S. The first and second retaining lips 18, 28 therefore serve to keep the capsule first portion 52 and the capsule second portion 62 centered in relation to the first holding base first end 12A and the second holding base second end 22A, thus resisting any potential lateral movement which may result from the repelling force generated between the first and second magnets 70, 80 as the first and second magnets 70, 80 are brought together in close proximity.

Note that in certain embodiments, the first and second threaded interlocking portions 56, 66 may be replaced with alternative capsule locking means which maintains the integrity of the capsule 50 and resists the repelling force generated between the first and second magnets 70, 80, as will be apparent to a person of ordinary skill in the art in the field of the invention. For example, the capsule first and second portions 52, 62 may be adhered together using an adhesive. In another example, the capsule locking means may be an interference fit configured between the capsule first and second portions 52, 62.

Figure 5A:
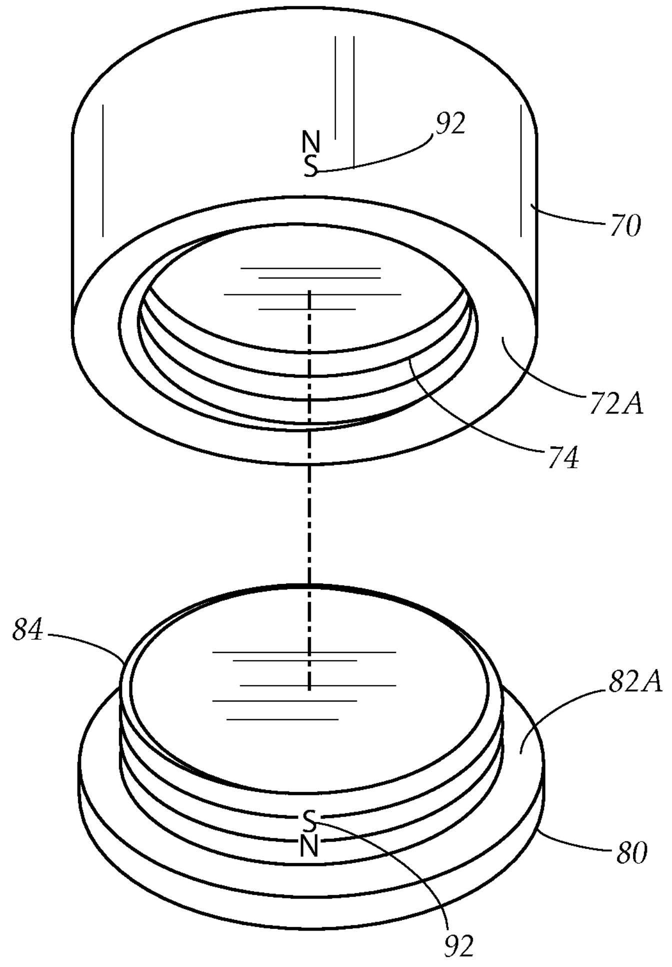
FIG. 5A is a diagrammatical exploded view of the first and second magnets, showing a first magnet recess disposed within the first magnet, and a second magnet threaded portion which projects from the second magnet to interlock with the first magnet recess, in accordance with an embodiment in the present disclosure.
Figure 5B:
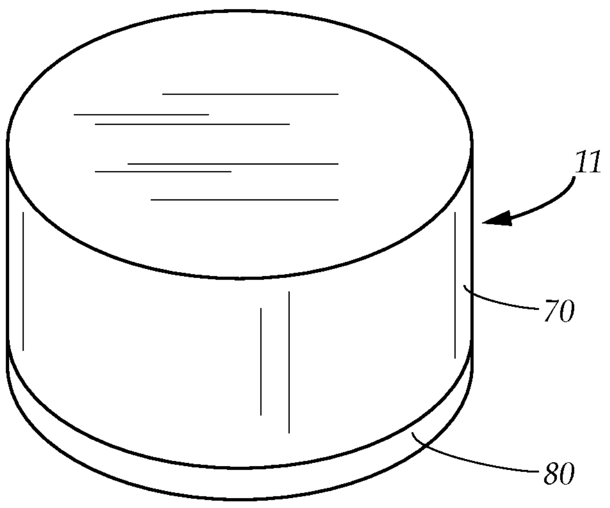
FIG. 5B is a diagrammatical perspective view showing the first and second magnets interlocked to form the repelling magnet combination, in accordance with an embodiment in the present disclosure.
Figure 5C:
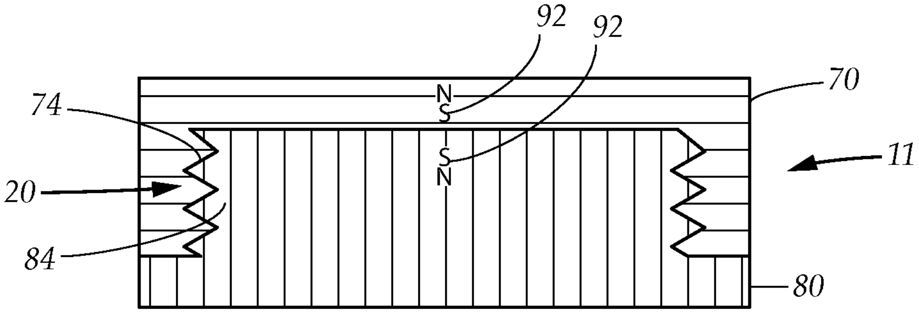
FIG. 5C is a diagrammatical sectional view showing the interlocked first and second magnets from the side, in accordance with an embodiment in the present disclosure.

Turning now to FIGS. 5A-B and 5C, in another embodiment, the repelling force countering means 20 is implemented as a physical interlock between the first and second magnets 70, 80, which overcomes the repelling force and maintains the first magnet first face 72A in contact with the second magnet first face 82A. In this embodiment, the first magnet 70 has a first magnet recess 74 disposed on the first magnet first face 72A, while the second magnet 80 has a second magnet protrusion 84 which extends away from the second magnet first face 82A. In a preferred embodiment, the first magnet recess 74 and the second magnet protrusion 84 are threaded and are adapted to form a threaded engagement. The second magnet protrusion 84 engages with the first magnet recess 74 and counters the repelling force by locking the first and second magnets 70, 80 together, allowing the first magnet first face 72A to remain in contact with the second magnet first face 82A.

Figure 5D:
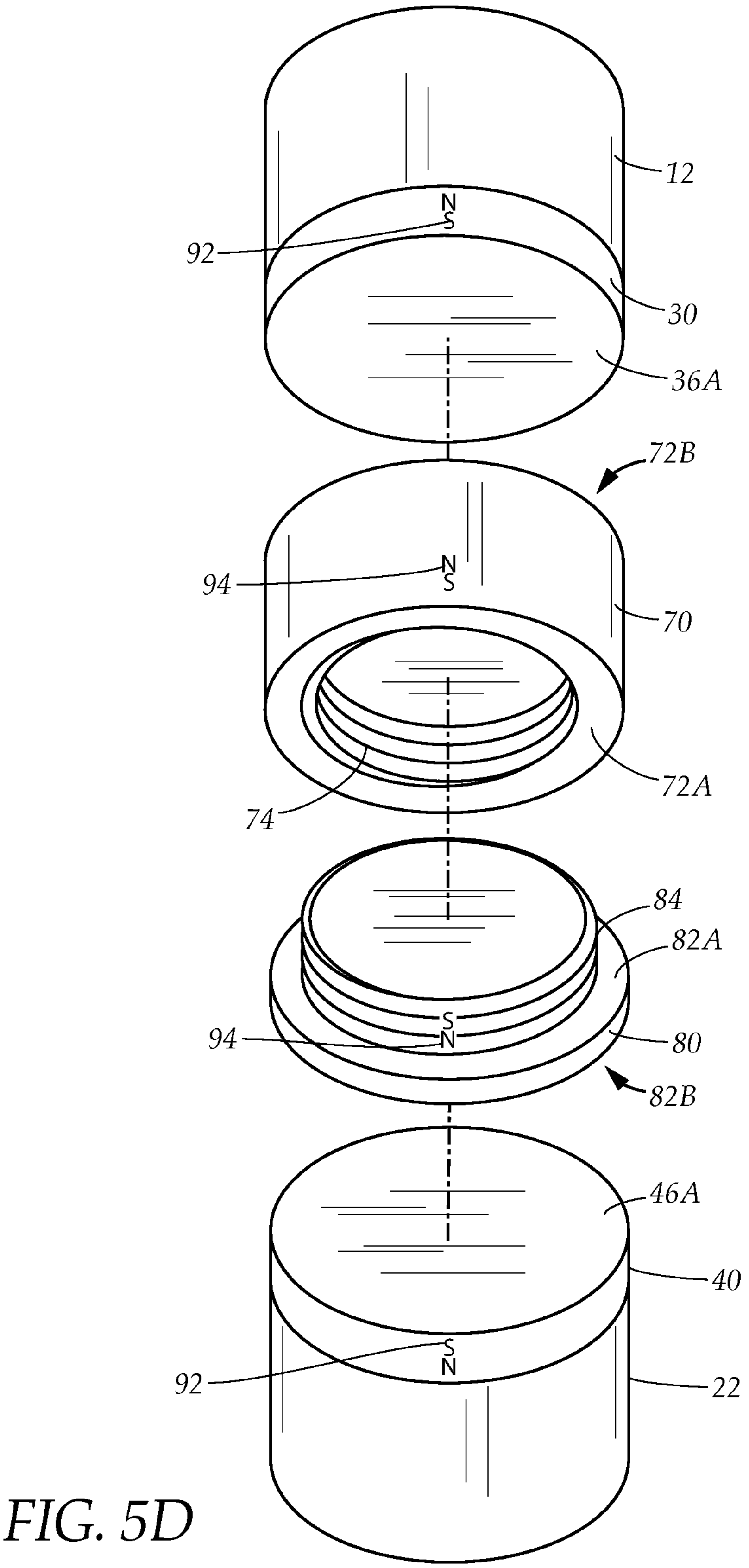
FIG. 5D is a diagrammatical exploded view showing the first magnet being attached to the first holding magnet and the first holding base showing the second magnet being attached to the second holding magnet and the second holding base, allowing the first magnet recess and the second magnet protrusion to be aligned for engagement, in accordance with an embodiment in the present disclosure.

Turning to FIG. 5D while also referring to FIGS. 3A-B and FIG. 5B, the first and second magnets 70, 80 are brought into contact with the aid of the first and second holding bases 12, 22. The first magnet second face 72B is magnetically attached to the first holding magnet first face 36A, while the second magnet second face 82A is magnetically attached to the second holding magnet first face 46A. The magnetic holding forces maintain the first and second magnets in place against the first holding base first face 12F and the second holding base first face 22F and counteract the repelling force as the first and second magnets are brought together. The second magnet protrusion 84 is aligned with and engages the first magnet recess 74. The first or the second magnet 70, 80 is turned by rotating either the first or the second holding base 12, 22, thus causing the first magnet recess 74 and the second magnet threaded protrusion to interlock in the repelling configuration. The interlocked first and second magnets 70, 80 are then detached from the first holding base first face 72A and the second holding base second first face 82A to complete the repelling magnet combination.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein are presented an apparatus and methods for assembling a repelling magnetic combination. The disclosure is illustrated by example in the drawing figures, and throughout the written description. It should be understood that numerous variations are possible, while adhering to the inventive concept. Such variations are contemplated as being a part of the present disclosure.

What is claimed is:

1. A repelling magnet combination, comprising:

a first magnet and a second magnet, the first magnet having a first magnet first face and a first magnet second face opposite thereof, and the second magnet having a second magnet first face and a second magnet second face opposite thereof, the first magnet first face and the second magnet first face each exhibit a first magnetic polarity which causes a repelling force to be generated therebetween, while the first magnet second face and the second magnet second face each exhibit a second magnetic polarity, the first magnet and the second magnet are arranged in a repelling configuration in which the first magnet first face contacts the second magnet first face; and a repelling force countering means adapted to physically hold the first magnet first face against the second magnet second face, and prevent the first magnet first face and the second magnet first face from separating by counteracting the repelling force generated therebetween, the repelling force countering means comprises a first magnet recess positioned at the first magnet first face and a second magnet protrusion positioned at the second magnet first face, whereby the second magnet protrusion engages with the first magnet recess to prevent the separation of the first and second magnets by the repelling force.

2. The repelling magnet combination of claim 1, further comprising a protective shell which encases the first magnet and the second magnet.

3. The repelling magnet combination as described in claim 1, wherein the first magnet recess and the second magnet protrusion have threads to facilitate a threaded interlock therebetween.

4. The repelling magnet combination as described in claim 1, further comprising:

a first holding base having a first holding magnet, and a second holding base having a second holding magnet, the first holding magnet is adapted to detachably hold the first magnet second face while the second holding magnet is adapted to detachably hold the second magnet second face, the first holding base and the second holding base are adapted to push the first magnet first face towards the second magnet first face to engage the repelling force countering means and assemble the repelling magnet combination.

5. A repelling magnet combination, comprising:

a first magnet and a second magnet, the first magnet having a first magnet first face and a first magnet second face opposite thereof, and the second magnet having a second magnet first face and a second magnet second face opposite thereof, the first magnet first face and the second magnet first face each exhibit a first magnetic polarity which causes a repelling force to be generated therebetween, while the first magnet second face and the second magnet second face each exhibit a second magnetic polarity, the first magnet and the second magnet are arranged in a repelling configuration in which the first magnet first face contacts the second magnet first face; and a repelling force countering means adapted to physically hold the first magnet first face against the second magnet second face, and prevent the first magnet first face and the second magnet first face from separating by counteracting the repelling force generated therebetween, the repelling force countering means comprises a capsule, the capsule having a capsule first portion and a capsule second portion, the capsule first portion having a first interlocking portion and a first magnet holding space for receiving the first magnet, the capsule second portion having a second interlocking portion and a second magnet holding space for receiving the second magnet, the first and second interlocking portions engage to lock together the capsule first portion and the capsule second portion, and the first and second magnets together are pressed together between the capsule first portion and the capsule second portion.

6. The repelling magnet combination as described in claim 5, wherein the first interlocking portion and the second interlocking portion each have threads, allowing the capsule first portion to threadably interlock with the capsule second portion.

* * * * *